United States Patent
Iwamoto

(10) Patent No.: US 9,157,767 B2
(45) Date of Patent: Oct. 13, 2015

(54) POSITION DETECTOR

(71) Applicant: DENSO CORPORATION, Kariya, Aichi-pref. (JP)

(72) Inventor: Reiji Iwamoto, Nagoya (JP)

(73) Assignee: DENSO CORPORATION, Kariya (JP)

( * ) Notice: Subject to any disclaimer, the term of this patent is extended or adjusted under 35 U.S.C. 154(b) by 605 days.

(21) Appl. No.: 13/648,344

(22) Filed: Oct. 10, 2012

(65) Prior Publication Data

US 2013/0088215 A1 Apr. 11, 2013

(30) Foreign Application Priority Data

Oct. 11, 2011 (JP) .................................. 2011-224223

(51) Int. Cl.
| | |
|---|---|
| *G01B 7/14* | (2006.01) |
| *G01B 7/30* | (2006.01) |
| *G01R 33/06* | (2006.01) |
| *G01D 5/14* | (2006.01) |
| *G01D 5/20* | (2006.01) |

(52) U.S. Cl.
CPC ................ *G01D 5/145* (2013.01); *G01D 5/147* (2013.01); *G01D 5/2033* (2013.01)

(58) Field of Classification Search
CPC ...... G01D 5/145; G01D 5/147; G01D 5/2033
USPC ................. 324/207.24, 207.25, 207.15, 207.2
See application file for complete search history.

(56) References Cited

U.S. PATENT DOCUMENTS

| | | | |
|---|---|---|---|
| 8,604,775 B2 * | 12/2013 | Iwamoto ................... | 324/117 H |
| 2002/0097224 A1 | 7/2002 | Nishino et al. | |
| 2006/0114221 A1 | 6/2006 | Sakurai et al. | |

FOREIGN PATENT DOCUMENTS

| | | |
|---|---|---|
| EP | 2 023 359 | 2/2009 |
| JP | 2004-038346 | 2/2004 |
| JP | 2004-69695 | 3/2004 |
| JP | 2007-323859 | 12/2007 |
| JP | 2010-225908 | 10/2010 |

OTHER PUBLICATIONS

Office Action (3 pages) dated Aug. 20, 2013, issued in corresponding Japanese Application No. 2011-224223 and English translation (5 pages).

* cited by examiner

*Primary Examiner* — Reena Aurora
(74) *Attorney, Agent, or Firm* — Nixon & Vanderhye PC

(57) ABSTRACT

In a position detector utilizing a Hall effect, a magnet is disposed to move relative to a circuit board. A conductive element is printed on the circuit board. A control circuit is mounted on the circuit board and is connected to the conductive element through a position detection wiring. The control circuit supplies an electric current to the conductive element through the position detection wiring such that the electric current flows in the conductive element in a first direction, detects a potential difference in a second direction perpendicular to the first direction in the conductive element, and performs an operation according to a position of the magnet relative to the conductive element based on the potential difference detected.

7 Claims, 7 Drawing Sheets

POSITION DETECTOR

CROSS REFERENCE TO RELATED APPLICATION

This application is based on Japanese Patent Application No. 2011-224223 filed on Oct. 11, 2011, the disclosure of which is incorporated herein by reference.

TECHNICAL FIELD

The present disclosure relates to a position detector using a Hall effect.

BACKGROUND

For example, JP2006-209651A, which corresponds to US 2006/0114221 A1, describes a position detector that detects a relative position between a magnet and an electromagnetic conversion element using the Hall effect.

In such a position detector, a potential difference occurs in the electromagnetic conversion element according to the relative position between the magnet and the electromagnetic conversion element. The electromagnetic conversion element outputs a signal according to the potential difference, and a control unit specifies the relative position between the magnet and the electromagnetic conversion element based on the signal outputted from the electromagnetic conversion element.

In a conventional position detector, the electromagnetic conversion element is provided by a specific integrated circuit (IC). That is, an IC for the electromagnetic conversion element needs to be prepared, in addition to a circuit board on which the control unit is mounted.

SUMMARY

According to an aspect of the present disclosure, a position detector includes a circuit board, a magnet, a conductive element, a control circuit, and a position detection wiring. The magnet is disposed to move relative to the circuit board while generating a magnetic field to pass through the circuit board. The control circuit is disposed on the circuit board, and the conductive element is printed on the circuit board. The conductive element defines a first point, a second point, a third point and a fourth point. The second point is in a first direction from the first point. The fourth point is in a second direction from the third point, the second direction intersecting the first direction. The position detection wiring connects the control circuit and the conductive element. The control circuit supplies an electric current to the conductive element through the position detection wiring such that the electric current flows in the conductive element from the first point to the second point, detects a potential difference between the third point and the fourth point of the conductive element, and performs an operation according to a position of the magnet relative to the conductive element based on the potential difference detected.

In the above structure, the control circuit is disposed on the circuit board, and the conductive element is printed on the circuit board as an electromagnetic conversion element. Namely, the electromagnetic conversion element is provided by the conductive element printed on the circuit board. Therefore, the number of components of the position detector reduces and the costs of the position detector reduces, as compared with a position detector in which the electromagnetic conversion element is provided by an IC.

BRIEF DESCRIPTION OF THE DRAWINGS

The above and other objects, features and advantages of the present disclosure will become more apparent from the following detailed description made with reference to the accompanying drawings, in which like parts are designated by like reference numbers and in which.

DETAILED DESCRIPTION

Hereinafter, an exemplary embodiment of the present disclosure will be described with reference to the drawings.

Figure 1:
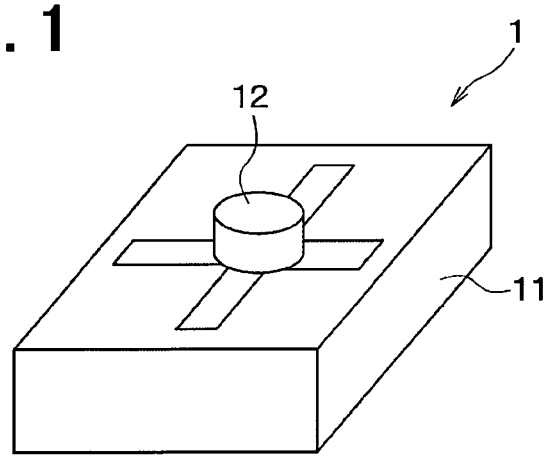
FIG. 1 is a perspective view of a position detector according to an embodiment of the present disclosure.
Figure 2:
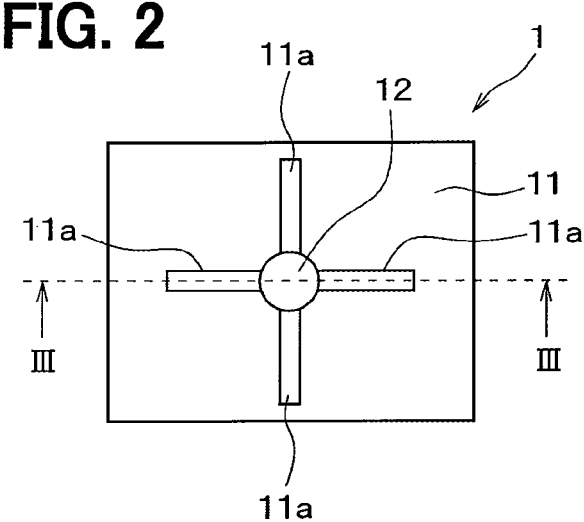
FIG. 2 is a plan view of the position detector according to the embodiment.
Figure 3:
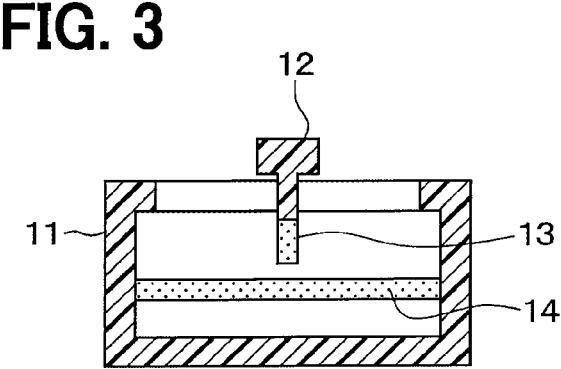
FIG. 3 is a cross-sectional view taken along a line III-III in FIG. 2.

Referring to FIGS. 1 through 3, a position detector 1 includes a housing 11, an operation portion 12, a magnet 13 and a circuit board 14.

The housing 11 includes a wall formed with a cross-shaped slit 11a. The operation portion 12 is a member that is directly operated by a user. The operation portion 12 is operable in the slit 11a in accordance with the user's operation. For example, the operation portion 12 is movable in front and rear directions (e.g., up and down directions in FIG. 2) and in left and right directions.

In the description, for a convenience of explanation, upper and lower ends of the position detector 1 shown in FIG. 2 are respectively referred to as front and rear ends of the position detector 1. Also, left and right ends of the position detector 1 shown in FIG. 2 are referred to as left and right ends of the position detector 1. Thus, an up and down direction in FIG. 2 corresponds to a front and rear direction of the position detector 1, and a left and right direction in FIG. 2 corresponds to a left and right direction of the position detector 1.

The magnet 13 is disposed in the housing 11, and is fixed to a lower end of the operation portion 12, the lower end being located inside the housing 11. The magnet 13 is moved with the operation portion 12. The magnet 13 is arranged such that both polarities are located at an upper end (e.g., top end in FIG. 3) and a lower end of the magnet 13.

The circuit board 14 is a printed circuit board. The circuit board 14 is disposed in and fixed to the housing 11. The circuit board 14 is disposed under the magnet 13. The circuit board 14 is opposed to the magnet 13 across a predetermined distance such that a magnetic field generated by the magnet 13 passes through the circuit board 14.

The circuit board 14 is fixed to the housing 11. The operation portion 12 moves relative to the housing 11. The magnet 13 moves with the operation portion 12. Therefore, the magnet 13 moves relative to the circuit board 14.

Next, the circuit board 14 will be described in detail.

Figure 4:
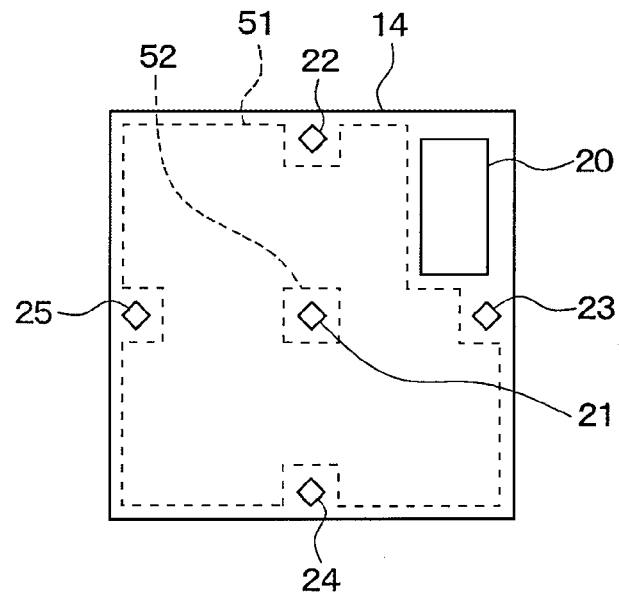
FIG. 4 is a plan view of a circuit board of the position detector according to the embodiment.

FIG. 4 is a plan view of the circuit board 14, when viewed from a top side of FIG. 3. The surface of the circuit board 14 shown in FIG. 4 corresponds to a front surface of the circuit board 14 facing the magnet 13. Hereinafter, the front surface is also referred to as the upper surface of the circuit board 14.

A microcontroller 20 is disposed on the upper surface of the circuit board 14. The microcontroller 20 corresponds to an example of a control unit.

At least one conductive element is printed on the upper surface of the circuit board 14. In the present embodiment, for example, five conductive elements 21-25 are printed on the upper surface of the circuit board 14 as pattern wirings. Further, other wirings are printed in an area of the circuit board 14 surrounded by a dashed line 51. Moreover, circuit components, such as a capacitor, a resistor and an IC, are mounted on the circuit board 14.

The conductive element 21 is printed at a center of the upper surface of the circuit board 14. The conductive element 22 is printed at a middle portion of a front end (e.g., upper end in FIG. 4) of the circuit board 14. The conductive element 23 is printed at a middle portion of a right end of the circuit board 14. The conductive element 24 is printed at a middle portion of a rear end (e.g., lower end in FIG. 4) of the circuit board 14. The conductive element 25 is printed at a middle portion of a left end of the circuit board 14. Each of the conductive elements 21-25 is printed, that is, made as a pattern wiring. Each of the conductive elements 21-25 is provided as a member made of a conductive material such as aluminum or copper and having a rectangular plate shape.

Each of the conductive elements 21-25 is connected to the microcontroller 20 through a position detection wiring. The position detection wiring is provided to supply an electric current from the microcontroller 20 to the conductive elements 21-25 such that the electric current flows between two points, such as a first point and a second point, of each conductive element, to detect a potential difference between other two points, such as a third point and a fourth point, of the conductive element. The position detection wirings are printed in the area of the circuit board 14 surrounded by the dashed line 51 as pattern wirings.

A size rate of the conductive elements 21-25 to the circuit board 14 may be 1:several tens as shown in FIG. 4, or may be approximately 1:1000. For example, in a case where the circuit board 14 has a square shape in which a length of each side is 10 cm, a full length of the conductive elements 21-25 may be approximately 0.1 mm.

Next, arrangement of the circuit components on the circuit board 14 will be described.

Figure 5:
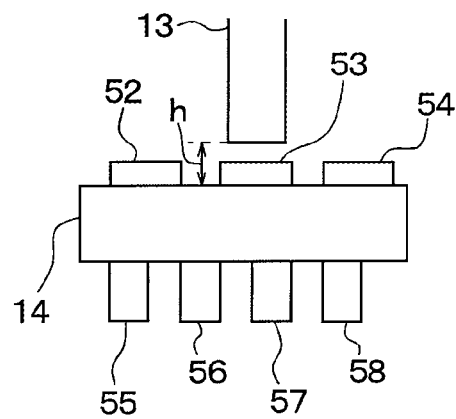
FIG. 5 is a schematic side view of the circuit board for illustrating arrangement of circuit components on the circuit board, according to the embodiment.

The magnet 13 and the circuit board 14 need to be arranged such that magnetic flux generated from the magnet 13 pass through the circuit board 14. The magnet 13 and the upper surface of the circuit board 14 are expected to be arranged as close as possible. Therefore, as shown in FIG. 5, circuit components 52-54 having the height smaller than a predetermined height are mounted on the upper surface of the circuit board 14, whereas circuit components 55-58 having the height equal to or greater than the predetermined height are mounted on an opposite surface (e.g., lower surface) of the circuit board 14.

In this case, the predetermined height is smaller than a minimum distance h between the end of the magnet 13 and the upper surface of the circuit board 14. For example, the predetermined height is 0.8 times the minimum distance h.

The circuit component having the height smaller than the predetermined height may be mounted on the lower surface, in place of the upper surface. In other words, at least the circuit components 55-58 having the height equal to or greater than the predetermined height are mounted on the lower surface of the circuit board 14. Therefore, the distance between the end of the magnet 13 and the upper surface of the circuit board 14 is reduced.

Figure 6:
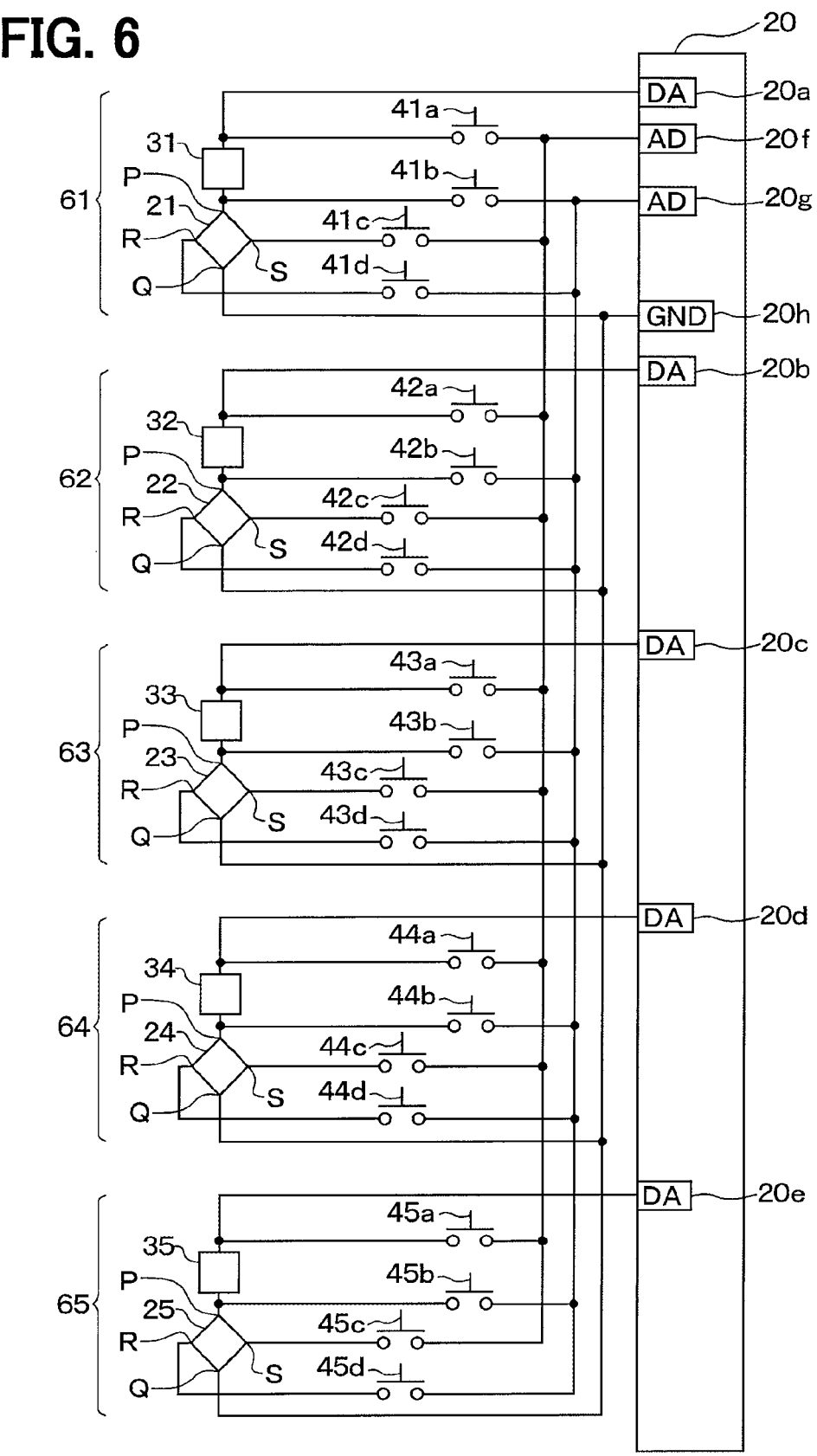
FIG. 6 is a schematic circuit diagram of the position detector according to the embodiment.

Next, the position detection wirings 61-65, which connect between the microcontroller 20 and the conductive elements 21-25, will be described with reference to FIG. 6.

First, the position detection wiring 61 for connecting the microcontroller 20 and the conductive element 21 will be described. The position detection wiring 61 includes a chip resistor 31, switches 41a-41d and printed wiring portions. For example, the conductive element 21 defines a first point P, a second point Q, a third point R, and a fourth point S at corners of the rectangle.

The position detection wiring 61 includes a wiring portion that connects a first end of the chip resistor 31 to a DA terminal 20a of the microcontroller 20, and a wiring portion that connects a second end of the chip resistor 31 to the first point P of the conductive element 21. Further, the position detection wiring 61 includes a wiring portion that connects the second point Q of the conductive element 21 to a GND terminal 20h of the microcontroller 20. When a voltage is applied to the DA terminal 20a, an electric current is generated in the conductive element 21 from the first point P to the second point Q.

The position detection wiring 61 includes a wiring portion that connects the third point R of the conductive element 21 to an AD terminal 20g of the microcontroller 20 through a switch 41d, and a wiring portion that connects the fourth point S of the conductive element 21 to an AD terminal 20f of the microcontroller 20 through a switch 41c. The microcontroller 20 detects a potential difference between the third point R and the fourth point S.

The position detection wiring 61 includes a wiring portion that extends from the wiring portion connecting the conductive element 21 and the chip resistor 31 to the AD terminal 20g through a switch 41b. Further, the position detection wiring 61 includes a wiring portion that extends from the wiring portion connecting the chip resistor 31 and the DA terminal 20a to the AD terminal 20f through a switch 41a. The microcontroller 20 detects a potential difference between the first end and the second end of the chip resistor 31.

The conductive element 21 is printed to have a width greater than the width of the wiring portions that connect to the first to fourth points P, Q, R, S. Therefore, the magnetic flux passing through the conductive element 21 is increased, and hence detection sensitivity improves.

The conductive element 22 defines the first point P, the second point Q, the third point R and the fourth point S at corners of the rectangle, similar to the conductive element 21. The position detection wiring 62 for connecting the microcontroller 20 and the conductive element 22 are printed in a similar manner to the position detection wiring 61. That is, the position detection wiring 62 includes a wiring portion to supply an electric current from the microcontroller 20 to the conductive element 22 such that the electric current is generated from the first point P to the second point Q in the conductive element 22, and a wiring portion to detect a potential difference between the third point R and the fourth point S.

For example, a description about the position detection wiring 62 is established by replacing the conductive element 21, the chip resistor 31, the switches 41a-41d, the DA terminal 20a, and the position detection wiring 61 of the above description about the position detection wiring 61 with the conductive element 22, a chip resistor 32, switches 42a-42d, a DA terminal 20b and the position detection wiring 62, respectively.

The conductive element 23 defines the first point P, the second point Q, the third point R and the fourth point S at corners of the rectangle, similar to the conductive element 21. The position detection wiring 63 for connecting the microcontroller 20 and the conductive element 23 are printed in a similar manner to the position detection wiring 61. That is, the position detection wiring 63 includes a wiring portion to supply an electric current from the microcontroller 20 to the conductive element 23 such that the electric current is generated from the first point P to the second point Q in the conductive element 23, and a wiring portion to detect a potential difference between the third point R and the fourth point S For example, a description about the position detection wiring 63 is established by replacing the conductive element 21, the chip resistor 31, the switches 41a-41d, the DA terminal 20a, and the position detection wiring 61 of the above description about the position detection wiring 61 with the conductive element 23, a chip resistor 33, switches 43a-43d, a DA terminal 20c and the position detection wiring 63, respectively.

The conductive element 24 defines the first point P, the second point Q, the third point R and the fourth point S at corners of the rectangle, similar to the conductive element 21. The position detection wiring 64 for connecting the microcontroller 20 and the conductive element 24 are printed in a similar manner to the position detection wiring 61. That is, the position detection wiring 64 includes a wiring portion to supply an electric current from the microcontroller 20 to the conductive element 24 such that the electric current is generated from the first point P to the second point Q in the conductive element 24, and a wiring portion to detect a potential difference between the third point R and the fourth point S.

For example, a description about the position detection wiring 64 is established by replacing the conductive element 21, the chip resistor 31, the switches 41a-41d, the DA terminal 20a, and the position detection wiring 61 of the above description about the position detection wiring 61 with the conductive element 24, a chip resistor 34, switches 44a-44d, a DA terminal 20d and the position detection wiring 64, respectively.

The conductive element 25 defines the first point P, the second point Q, the third point R and the fourth point S at corners of the rectangle, similar to the conductive element 21. The position detection wiring 65 for connecting the microcontroller 20 and the conductive element 25 are printed in a similar manner to the position detection wiring 61. That is, the position detection wiring 65 includes a wiring portion to supply an electric current from the microcontroller 20 to the conductive element 25 such that the electric current is generated from the first point P to the second point Q in the conductive element 25, and a wiring portion to detect a potential difference between the third point R and the fourth point S.

For example, a description about the position detection wiring 65 is established by replacing the conductive element 21, the chip resistor 31, the switches 41a-41d, the DA terminal 20a, and the position detection wiring 61 of the above description about the position detection wiring 61 with the conductive element 25, the chip resistor 35, the switches 45a-45d, the DA terminal 20e and the position detection wiring 65, respectively.

The switches 41a-41d, 42a-42d, 43a-43d, 44a-44d, 45a-45d are respectively connected to ports of the microcontroller 20 through wirings (not shown) printed on the circuit board 14. The microcontroller 20 controls an on state (connected state) and an off state (disconnected state) of each of the switches 41a-41d, 42a-42d, 43a-43d, 44a-44d, 45a-45d, independently.

In the area surrounded by the dashed line 51 in FIG. 2, wirings and circuit components other than the position detection wirings 61-65 are disposed. As example of the wirings and circuit components other than the position detection wirings 61-65, an interface circuit for an in-vehicle LAN, power source circuits for supplying electric power to various electronic components in a vehicle, such as in-vehicle electronic control units for a keyless entry system or a smart entry system, a body electronic control unit, various circuits for photographing a driver inside the vehicle, an acceleration sensor, and a yaw rate sensor, are included.

Namely, the position detection wirings 61-65 and the conductive elements 21-25 are disposed on the circuit board 14 together with the other wirings and circuit components. Therefore, the position detector 1 is provided by effectively using the existing circuit board 14. In other words, the position detector 1 is provided by effectively using the circuit board 14 that is also used for another purpose.

In the position detector 1 having the structure described above, the position of the magnet 13 relative to the circuit board 14 is detected in the following manner.

Figure 7:
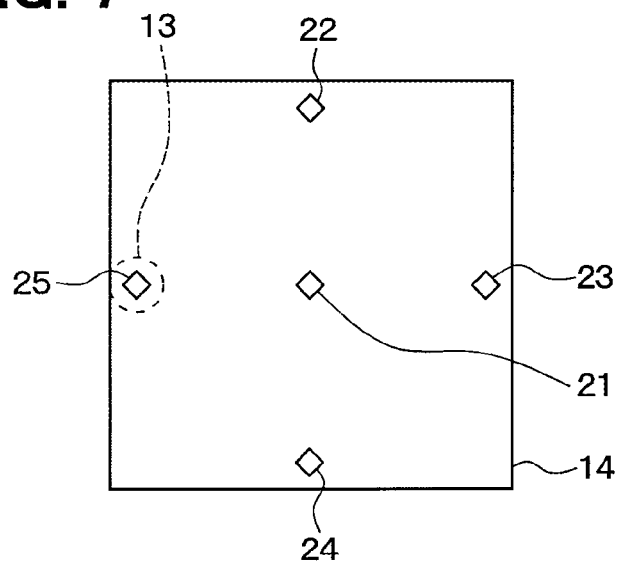
FIG. 7 is a schematic diagram illustrating an example of a position of a magnet relative to the circuit board according to the embodiment.
Figure 8:
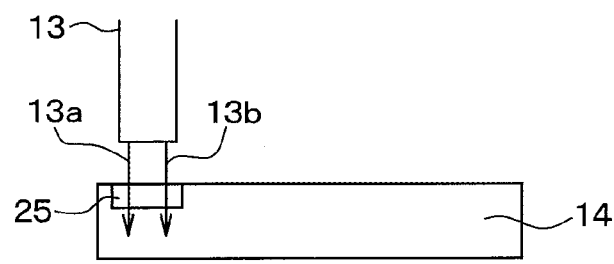
FIG. 8 is a schematic side view of the circuit board and the magnet for illustrating magnetic fluxes generated from the magnet and passing through a conductive element of the circuit board according to the embodiment.

As the user operates the operation portion 12, the magnet 13 moves with the operation portion 12. For example, when the magnet 13 is positioned directly above the conductive element 25, as shown in FIG. 7, magnetic fluxes 13a, 13b passing through the conductive element 25 are stronger than magnetic fluxes passing through the conductive elements 21-24, as shown in FIG. 8.

Figure 9:
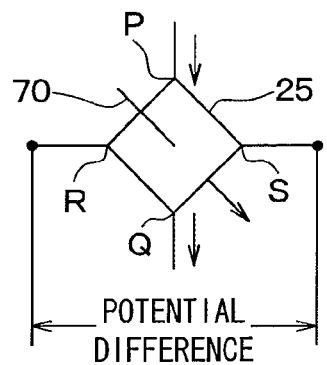
FIG. 9 is a schematic diagram for explaining a potential difference generated in the conductive element according to the embodiment.

Therefore, as shown in FIG. 9, in a state where a magnetic flux 70 passes through the conductive element 25, when the electric current is generated to flow from the first point P to the second point Q, a potential difference occurs between the third point R and the fourth point S. The relative position of the magnet 13 to the circuit board 14 can be detected by detecting the potential differences generated in the conductive elements 21-25.

Next, operations of the position detector 1 will be described in detail. Firstly, a first adjusting operation of the position detector 1 will be described with reference to a flowchart shown in FIG. 10. The first adjusting operation is performed when the position detector 1 is installed. The first adjusting operation is performed to detect a potential difference generated in each of the conductive elements 21-25 in a state where the magnetic field of the magnet 30 does not exist.

At S110, the position detector 1 is fixed to a predetermined position, such as a dashboard of a vehicle. In this case, the magnet 13 is removed from the position detector 1.

At S120, the position detector 1 is electrically coupled. That is, electric power is supplied to the position detector 1. In this case, as the microcontroller 20 is activated for the first time, a potential difference between the third point R and the fourth point S of each of the conductive elements 21-25 is measured. Hereinafter, the potential difference between the third point R and the fourth point S is also referred to as the RS potential difference.

For example, firstly, the switches 41c, 41d are turned on, and the other switches 42c, 42d, 43c, 43d, 44c, 44d, 45c, 45d are turned off. In this state, a potential difference between the AD terminal 20f and the AD terminal 20g is detected to obtain the RS potential difference of the conductive element 21, that is, the potential difference between the third point R and the fourth point S of the conductive element 21.

Next, the switches 42c, 42d are turned on, and the other switches 41c, 41d, 43c, 43d, 44c, 44d, 45c, 45d are turned off. In this state, a potential difference between the AD terminal 20f and the AD terminal 20g is detected to obtain the RS potential difference of the conductive element 22.

Next, the switches 43c, 43d are turned on, and the other switches 41c, 41d, 42c, 42d, 44c, 44d, 45c, 45d are turned off. In this state, a potential difference between the AD terminal 20f and the AD terminal 20g is detected to obtain the RS potential difference of the conductive element 23.

Next, the switches 44c, 44d are turned on, and the other switches 41c, 41d, 42c, 42d, 43c, 43d, 45c, 45d are turned off. In this state, a potential difference between the AD terminal 20f and the AD terminal 20g is detected to obtain the RS potential difference of the conductive element 24.

Next, the switches 45c, 45d are turned on, and the other switches 41c, 41d, 42c, 42d, 43c, 43d, 44c, 44d are turned off. In this state, a potential difference between the AD terminal 20f and the AD terminal 20g is detected to obtain the RS potential difference of the conductive element 25.

At S140, the microcontroller 20 stores the RS potential difference of each of the conductive elements 21-25 detected at S130 in a storage medium, such as a flash memory disposed on the circuit board 14, as a base potential difference. The base potential differences stored at S140 are used for correcting a potential difference of each of the conductive elements 21-25 in the detection of the relative position of the magnet 13.

Next, a second adjusting operation of the position detector 1 will be described with reference to a flowchart shown in FIG. 11. The second adjusting operation is performed when the position detector 1 is installed. The second adjusting operation is performed to equalize an electric current flowing in each of the conductive elements 21-25, between the conductive elements 21-25. When the electric currents flowing in the conductive elements 21-25 are equal, the Hall effect affecting each of the conductive elements 21-25 is uniform.

Figure 11:
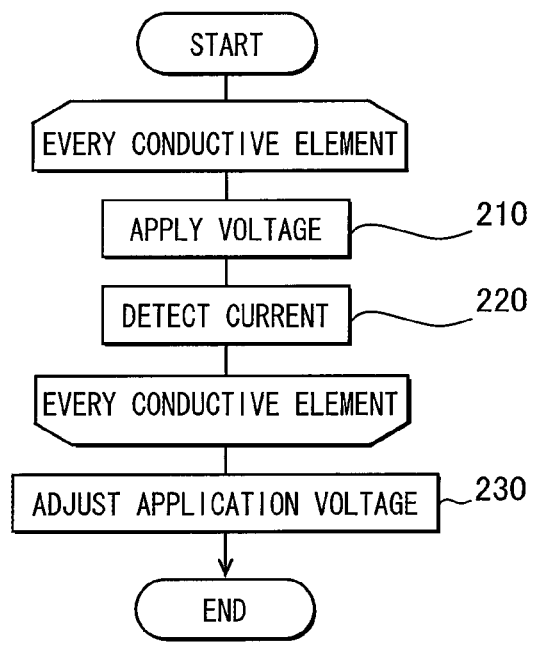
FIG. 11 is a flowchart illustrating a process for equalizing electric currents flowing in the conductive elements according to the embodiment.

Every time the microcontroller 20 is activated, the microcontroller 20 begins the second adjusting operation shown in FIG. 11 and performs a process of S210 and S220 for each of the conductive elements 21-25. Hereinafter, the conductive element for which a process is conducted is referred to as the subject element.

For example, when the conductive element 21 is the subject element, that is, when an electric current flowing in the conductive element 21 is to be detected, at S210, a predetermined voltage is applied to the conductive element 21 and the chip resistor 31 connecting to the conductive element 21. At S220, the electric current flowing in the conductive element 21 from the first point P to the second point Q is measured.

Specifically, at S210, a predetermined voltage is applied to the DA terminal 20a to generate a predetermined potential difference between the DA terminal 20a and the GND terminal 20h.

Also, at S210, the switches 41a, 41b are turned on, and the other switches 41c, 41d, 42a-42d, 43a-43d, 44a-44d, 45a-45d are turned off. In this state, a potential difference V0 between the first end and the second end of the chip resistor 31, corresponding to a potential difference between the AD terminal 20f and the AD terminal 20g, is detected. The potential difference V0 detected is divided by a resistance value of the chip resistor 31 that is stored beforehand in a storage medium, such as a ROM or a flash memory, of the position detector 1 to obtain a value of the electric current flowing in the chip resistor 31. The value of the electric current detected is specified as the value of the electric current flowing from the first point P to the second point Q of the conductive element 21. It is to be noted that an electric current does not flow between the chip resistor 31 and the AD terminals 20f, 20g.

The process of S210 and S220 described above is performed for the other conductive elements 22-25 in a similar manner. When the conductive element 22 is the subject element, in the above description about the conductive element 21, the conducive element 21, the DA terminal 20a, the chip resistor 31, and the switches 41a, 41b are replaced with the conductive element 22, the DA terminal 20b, the chip resistor 32 and the switches 42a, 42b, respectively.

When the conductive element 23 is the subject element, in the above description about the conductive element 21, the conducive element 21, the DA terminal 20a, the chip resistor 31, and the switches 41a, 41b are replaced with the conductive element 23, the DA terminal 20c, the chip resistor 33 and the switches 43a, 43b, respectively.

When the conductive element 24 is the subject element, in the above description about the conductive element 21, the conducive element 21, the DA terminal 20a, the chip resistor 31, and the switches 41a, 41b are replaced with the conductive element 24, the DA terminal 20d, the chip resistor 34 and the switches 44a, 44b, respectively.

When the conductive element 25 is the subject element, in the above description about the conductive element 21, the conducive element 21, the DA terminal 20a, the chip resistor 31, and the switches 41a, 41b are replaced with the conductive element 25, the DA terminal 20e, the chip resistor 35 and the switches 45a, 45b, respectively.

At S230, the microcontroller 20 corrects the voltage applied from each of the DA terminals 20a-20e to the corresponding conductive elements 21-25, based on the electric current flowing in each of the conductive elements 21-25 specified above such that the electric current flowing in each of the conductive elements 21-25 is equal between the conductive elements 21-25.

For example, when the voltage applied to each of the DA terminals 20a-20e at S210 is equal as the voltage V0, an average value of the electric currents specified for the conductive elements 21-25 is defined as I0. Also, the value of the electric current specified for each of the conductive elements 21, 22, 23, 24, 25 is defined as I1, I2, I3, I4, I5, respectively. In this case, values of application voltages to be applied to the DA terminals 20a, 20b, 20c, 20d, 20e are adjusted as values I0/I1×V0, I0/I2×V0, I0/I3×V0, I0/I4×V0, I0/I5×V0 such that the value of the electric current is equalized as the value I0 between the conductive elements 21-25. The values I0/I1× V0, I0/I2×V0, I0/I3×V0, I0/I4×V0, I0/I5×V0 are stored in a storage medium such as a RAM of the microcontroller 20 as adjusted application voltages.

Next, a process of detecting the position of the magnet 13 relative to the conductive elements 21-25 fixed to the circuit board 14 will be described with reference a flowchart shown in FIG. 12.

Figure 12:
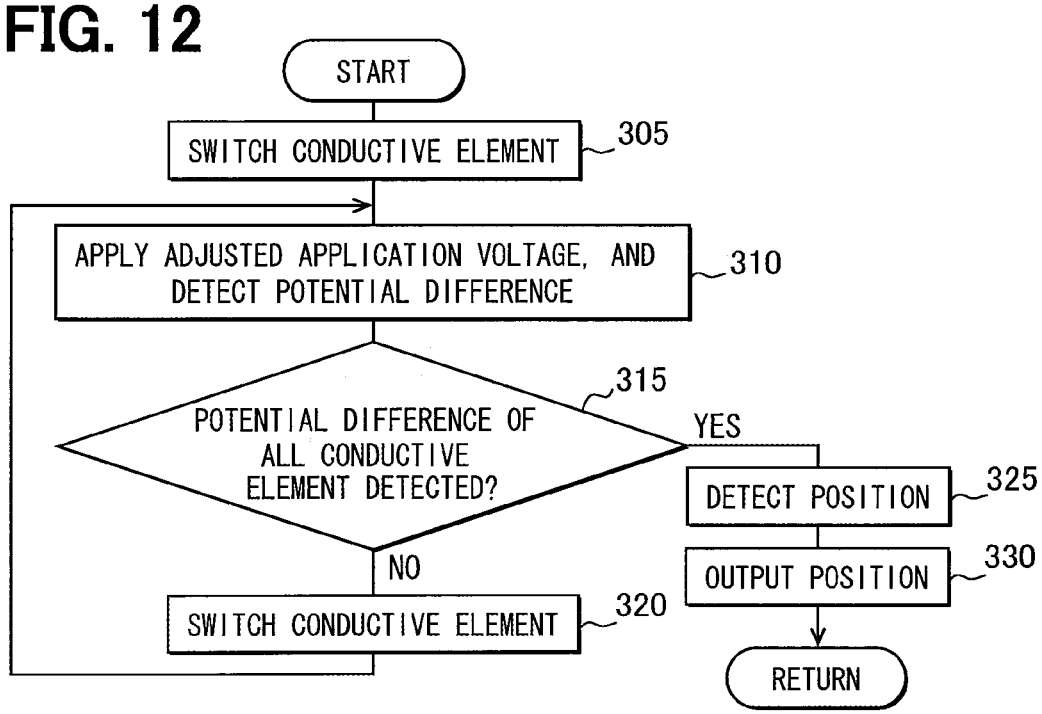
FIG. 12 is a flowchart illustrating a process of detecting a position of the magnet according to the embodiment.

When the microcontroller 20 is activated, the process of FIG. 12 is performed after the second adjusting process of FIG. 11 is performed. When the microcontroller 20 is activated for the first time, the process of FIG. 12 is performed after the first adjusting process of FIG. 10 and the second adjusting process of FIG. 11 are performed.

At S305, one of the conductive elements 21-25 is set to an active state as the subject element to detect the potential difference between the third point R and the fourth point S, that is, the RS potential difference. For example, when the conductive element 21 is to be set as the subject element, the switches 41c, 41d are turned on and the switches 42c, 42d, 43c, 43d, 44c, 44d, 45c, 45d are turned off. In this case, the switches 41a, 41b, 42a, 42b, 43a, 43b, 44a, 44b, 45a, 45b are also turned off.

At S310, the adjusted application voltage for the conductive element 21 is read from the storage medium, and is applied to the DA terminal 20a. In this case, the electric current I0 flows from the first point P to the second point Q in the conductive element 21. Therefore, the potential difference occurs between the third point R and the fourth point S according to the magnetic flux generated by the magnet 13 and passing through the conductive element 21. This RS potential difference is detected as the potential difference between the AD terminal 20f and the AD terminal 20g. In this case, an electric current does not flow between the AD terminal 20f and the AD terminal 20g of the conductive element 21.

For example, when the magnet 13 is positioned directly above the conductive element 21, the RS potential difference of the conductive element 21 is the largest. On the other hand, when the magnet 13 is positioned further from the conductive element 21, such as directly above the conductive element 25, the RS potential difference of the conductive element 21 is very small or not generated.

Figure 10:
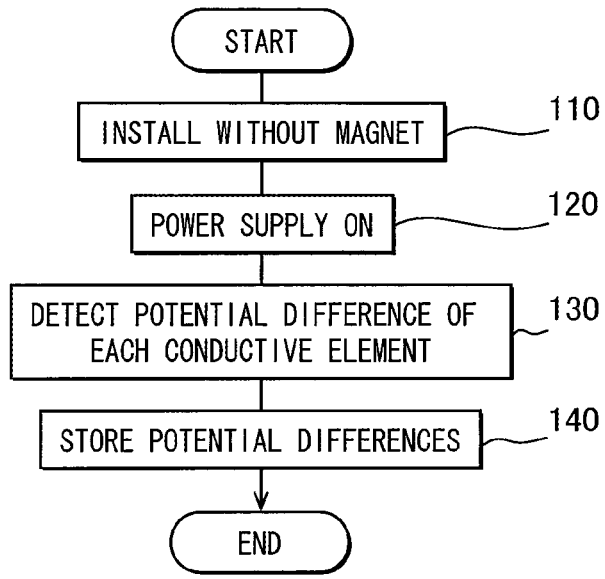
FIG. 10 is a flowchart illustrating a process for specifying a base voltage of each of conductive elements of the position detector according to the embodiment.

At S310, the base potential difference of the conductive element 21 stored in the process of FIG. 10 is subtracted from the RS potential difference of the conductive element 21. The value obtained from the subtraction is stored in the RAM as an adjusted RS potential difference of the conductive element 21.

At S315, it is determined whether the RS potential differences of all the conductive elements 21-25 have been detected after S310. For example, the RS potential difference of only the conductive element 21 has been detected. In this case, the determination result of S315 corresponds to "No", and the process proceeds to S320.

At S320, the subject element is switched from the conductive element 21 to the conductive element 22. Specifically, the switches 42c, 42d are turned on and the switches 41c, 41d, 43c, 43d, 44c, 44d, 45c, 45d are turned off. Then, the process proceeds to S310.

At S310, the process is performed for the conductive element 22. Specifically, the adjusted application voltage for the conductive element 22 is applied to the DA terminal 20a to generate the electric current I0 between the first point P and the second point Q of the conductive element 22. The RS potential difference between the third point R and the fourth point S of the conductive element 22 is detected as a potential difference between the AD terminal 20f and the AD terminal 20g.

Further, the base potential difference for the conductive element 22 stored in the process of FIG. 10 is subtracted from the RS potential difference of the conductive element 22. The value obtained by the subtraction is stored as an adjusted RS potential difference of the conductive element 22 in the RAM.

At S315, since the RS potential difference has been detected only for the conductive elements 21, 22, it is determined that the RS potential difference has not been detected for all the conductive elements 21-25. Thus, the process proceeds to S320.

At S320, the subject element is switched from the conductive element 22 to the conductive element 23. Specifically, the switches 43c, 43d are turned on, and the switched 41c, 41d, 42c, 42d, 44c, 44d, 45c, 45d are turned off. Then, the process returns to S310.

At S310, the process is performed for the conductive element 23, and the adjusted RS potential difference of the conductive element 23 is stored in the RAM. At S315, it is determined that there are the conductive elements whose RS potential differences have not been detected. Thus, the process proceeds to S320, and the subject element is switched from the conductive element 23 to the conductive element 24. Specifically, the switches 44c, 44d are turned on, and the switches 41c, 41d, 42c, 42d, 43c, 43d, 45c, 45d are turned off. Then, the process returns to S310 to detect the RS potential difference of the conductive element 24.

At S310, the process is performed for the conductive element 24, and the adjusted RS potential difference of the conductive element 24 is stored in the RAM. At S315, it is determined that there is the conductive element whose RS potential difference has not been detected. At S320, the subject element is switched from the conductive element 24 to the conductive element 25. Specifically, the switches 45c, 45d are turned on, and the switches 41c, 41d, 42c, 42d, 43c, 43d, 44c, 44d are turned off. Then, the process returns to S310 to detect the RS potential difference of the conductive element 25.

At S310, the process is performed for the conductive element 25, and the adjusted RS potential difference of the conductive element 25 is stored in the RAM.

At S315, as it is determined that the RS potential difference has been detected for all the conductive elements 21-25, the process proceeds to S325.

As described above, the electric current is supplied successively to the conductive elements 21-25 such that the electric current is supplied to only one of the conductive elements 21-25 at a time, in the detection of the adjusted RS potential difference of each of the conductive elements 21-25. Therefore, as compared to a case where the electric current is generated in all the conductive elements 21-25 at a time, power consumption is reduced. Also, the number of the AD terminals of the microcontroller 20 is reduced. That is, the RS potential difference of all the conductive elements 21-25 can be detected using two AD terminals of the microcontroller 20.

In the process of FIGS. 12, S310, S315 and S320 are repeated. The time period required to perform a routine of S310, S315 and S320 for one conductive element may be in a range from 20 milliseconds to 200 milliseconds, for example. In such a case, it may take approximately 100 milliseconds to approximately 1 second to obtain the adjusted RS potential differences of all the conductive elements 21-25. The time period for applying the voltage to the DA terminal 20a at S310 in one routine may be in a range from 10 milliseconds to 100 milliseconds.

At S320, the position of the magnet 13 relative to the conductive elements 21-25 is specified based on the adjusted RS potential differences of the conductive elements 21-25, which are obtained by the repetition of S310. The position of the magnet 13 may be specified by various methods with various resolution performances.

For example, the position of the magnet 13 may be specified based on a maximum value of absolute values of the adjusted RS potential differences. Namely, when the absolute value of the adjusted RS potential difference of one of the conductive elements 21-25 is the maximum, it is determined that the magnet 13 is positioned directly above the one of the conductive elements 21-25.

For example, when the absolute value of the adjusted RS potential difference of the conductive element 25 is the largest, it is specified that the magnet 13 is in a left of the circuit board 14 from the center of the circuit board 14. For example, when the absolute value of the adjusted RS potential difference of the conductive element 21 is the largest, it is specified that the magnet 13 is at a center of the circuit board 14.

As another example, the position of the magnet 13 may be determined by a weighted average M of positions X1-X5 (X1-X5 are defined by two dimensional vector) of the conducive elements 21-25 that are weighted by absolute values W1-W5 of the adjusted RS potential differences (i.e., $M=W1 \times X1+W2 \times X2+W3 \times X3+W4 \times X4+W5 \times X5$.)

At S330, data indicating the position of the magnet 13 specified at S325 is outputted to an external apparatus, such as an in-vehicle navigation apparatus coupled to the position detector 1. After S330, the process returns to S305.

As described above, the microcontroller 20 supplies the electric current to the subject element such that the electric current flows from the first point P to the second point Q of the subject element, detects the RS potential difference of the subject element, and obtains the adjusted RS potential difference of the subject element. The microcontroller 20 performs this process to each of the conductive elements 21-25. The microcontroller 20 specifies the position of the magnet 13 relative to the conductive elements 21-25 based on the adjusted RS potential differences of the conductive element 21-25, and outputs the position specified to the external apparatus.

Accordingly, in the position detector 1, the conductive elements 21-25 as the electromagnetic conversion elements are formed as pattern wirings, that is, printed on the circuit board 14 on which the control circuit 20 is disposed. The position of the magnet 13 relative to the conductive elements 21-25 is detected based on the potential differences generated in the conductive elements 21-25. Since the electromagnetic conversion elements are provided by the printed wirings, the number of components and the manufacturing cost reduce, as compared to the case where the electromagnetic conversion elements are provided by an IC.

Each of the conductive elements 21-25 is printed to have a width greater than that of the wiring portions of the position detection wirings 61-65. Therefore, the magnetic flux passing through the conductive elements 21-25 can be increased. Accordingly, detection sensitivity improves.

The wiring portions of the position detection wirings 61-65 and the conductive elements 21-25 may be made of the same material or different materials. When the wiring portions of the position detection wirings 61-65 and the conductive elements 21-25 are made of the same material, the position detector 1 may be easily manufactured with reduced costs.

Other Embodiments (1) In the exemplary embodiment described above, the circuit board 14 have the printed wirings only on the upper surface and the lower surface. Alternatively, the circuit board 14 may be a multilayer board in which the wirings are printed in three or more layers. In such a case, other conductive elements may be printed in layers at positions corresponding to the positions of the conductive elements 21-25.

Figure 13:
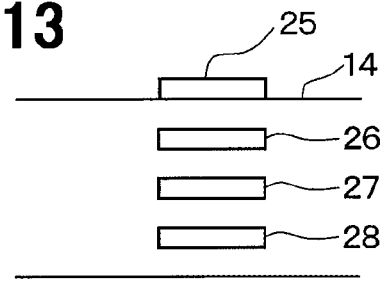
FIG. 13 is a schematic diagram illustrating a multilayer circuit board with conductive elements as an example of the circuit board.

For example, as shown in FIG. 13, conductive elements 26-28 may be formed at positions corresponding to the conductive element 25. In this case, the conductive elements 26-28 may have the first point P, the second point Q, the third point R and the fourth point S, similar to the conductive element 25, and be connected to the microcontroller 20 through a position detection wiring similar to the position detection wiring 62.

Also in this case, the electric current is generated between the first point P and the second point Q of each of the conductive elements 25-28, and the RS potential difference between the third point R and the fourth point S of each of the conductive elements 25-28 is detected. The RS potential differences of the conductive elements 25-28 may be used for the detection of position of the magnet 13, such as the position of the magnet 13 in a plane parallel to the circuit board 14. In such a case, accuracy of specifying the position of the magnet 13 improves around the conductive elements 25-28.

Figure 14:
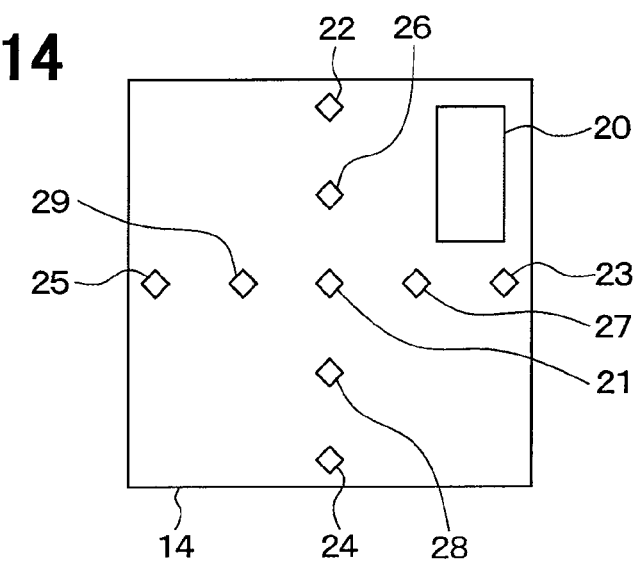
FIG. 14 is a schematic plan view of the circuit board for illustrating an example of arrangement of the conductive elements.

(2) The number of the conductive elements printed in one layer of the circuit board 14, such as on the upper surface of the circuit board, may not be limited to five, but may be increased or decreased. FIG. 14 illustrates an example in which none conductive elements 21-29 are printed on the upper surface of the circuit board 14. In this case, the electric current is generated between the first point P and the second point Q of each of the nine conductive elements 21-29, and the RS potential difference between the third point R and the fourth point S is detected for each of the nine conductive elements 21-29. Therefore, accuracy of detecting the position of the magnet 13 further improves.

Figure 15:
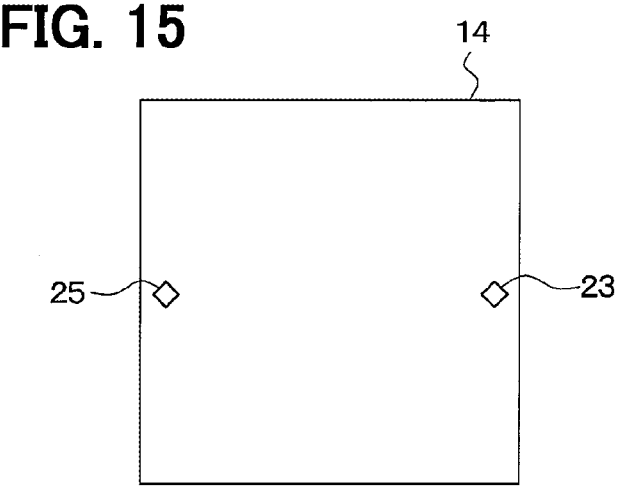
FIG. 15 is a schematic plan view of the circuit board for illustrating another example of arrangement of the conductive elements.

(3) The position detector 1 may be configured such that the magnet 13 is movable only in the left and right directions, the conductive elements 21, 22, 24 may be eliminated, as shown in FIG. 15. In such a case, the conductive elements 23, 25 are formed on the circuit board 14, and connected to the microcontroller 20 through the position detection wirings 63, 65. Also in this case, the position of the magnet 13 can be detected with respect to the left and right directions of FIG. 15. This structure may be employed as an off switch in which the magnet 13 is moved to the left to turn on the switch and moved to the right to turn off the switch.

Figure 16:
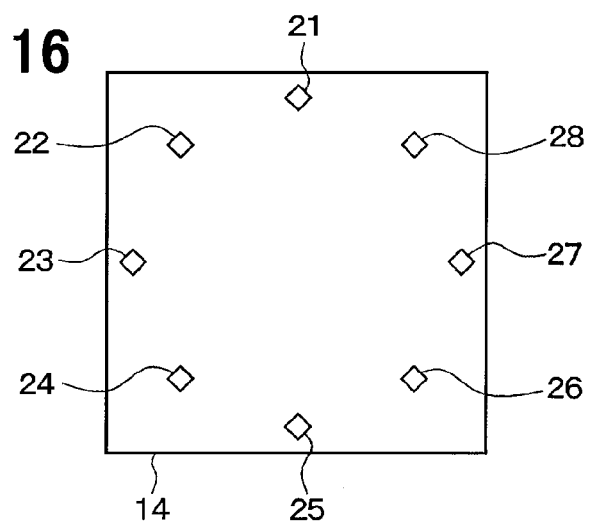
FIG. 16 is a schematic plan view of the circuit board for illustrating further another example of arrangement of the conductive elements.

(4) The position detector 1 may be configured such that the magnet 13 is moved in a circular shape on a plane parallel to the circuit board 14. In such a case, as shown in FIG. 16, the conductive element 21-28 may be printed along a circle. Also in this case, the electric current is generated in the first point P and the second point Q of each of the conductive elements 21-28, and the RS potential difference between the third point R and the fourth point S is detected for each of the conductive elements 21-28.

Figure 17:
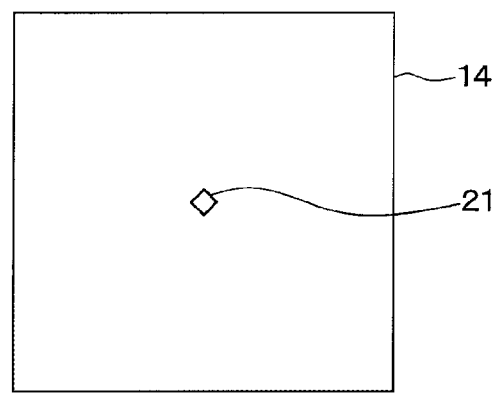
FIG. 17 is a schematic plan view of the circuit board for illustrating still another example of arrangement of the conductive element.

(5) The position detector 1 may be configured such that the magnet 13 is moved in up and down directions, such as in directions perpendicular to the circuit board 14. In such a case, as shown in FIG. 17, the conductive elements 22-25 may be eliminated, and one conductive element 21 may be printed on the circuit board 14. Also in this case, the position of the magnet 13 can be detected with respect to a direction perpendicular to the circuit board 14, such as a direction perpendicular to a paper surface of FIG. 17. This structure may be employed to an off switch in which the magnet 13 is moved toward the circuit board 14 to turn on the switch and is moved away from the circuit board 14, that is, the conductive element 21, to turn off the switch.

(6) In the exemplary embodiment described above, the chip resistors 31-35 are employed to equalize the electric currents flowing in the conductive elements 21-25. The detection accuracy improves by equalizing the electric currents flowing in the conductive elements 21-25. However, in a case where the improvement of the detection accuracy is not required, the chip resistors 31-35 and the switches 41a-45a, 41b-45b are not necessary. In such a case, the DA terminals 20a-20e may be connected to the conductive elements 21-25, respectively, through printed wirings.

(7) In the exemplary embodiment described above, the magnet 13 is always perpendicular to the circuit board 14. However, the magnet 13 may be arranged such that the magnet 13 has an inclination with respect to the direction perpendicular to the circuit board 14 in accordance with location or movement of the magnet 13. For example, the magnet 13 may be moved in a rotation manner about a predetermined starting point.

(8) In the exemplary embodiment described above, the microcontroller 20 is employed as a control unit. However, the control unit may be provided by any device other than the microcontroller.

(9) In the exemplary embodiment described above, the first point P, the second point Q, the third point R and the fourth point S are defined at different positions from each other within one conductive element. However, one of the first point P and the second point Q may be defined common to one of the third point R and the fourth point S. In such a case, both of the first point P and the second point Q should not be defined common to one of the third point R and the fourth point S.

In the exemplary embodiment described above, the first position P and the second position Q are defined on a first axis, and the third point R and the fourth position S are defined on a second axis that passes through and is perpendicular to the first axis. However, the arrangement of the first position P, the second position Q, the third position R and the fourth position S are not limited to the above example. The potential difference generated by the Hall effect can be detected by arranging the first point P, the second point, the third point R and the fourth point S as follows.

When a direction from the first point P to the second point Q is defined as a first direction, and a direction that begins from the third point R and intersects the first direction is defined as a second direction, the fourth point S is defined by a point that is located in the second direction from the point R. In other words, the third point R and the fourth point S may be defined on a second axis that intersect a first axis on which the first point O and the second point P are defined.

(10) In the exemplary embodiment described above, the microcontroller 20 performs an operation according to the position of the magnet 13 relative to the conductive element based on the RS potential differences detected. The operation includes specifying of the position of the magnet 13 and outputting of the position specified. However, the operation is not limited to the specifying of the position of the magnet 13 and the outputting of the position specified.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:

1. A position detector comprising:
   a circuit board;
   a magnet disposed to move relative to the circuit board while generating a magnetic field to pass through the circuit board;
   a control circuit disposed on the circuit board;
   a conductive element printed on the circuit board, the conductive element defining a first point, a second point, a third point and a fourth point, the second point being in a first direction from the first point, the fourth point being in a second direction from the third point, the second direction intersecting the first direction; and
   a position detection wiring connecting the control circuit and the conductive element, wherein
   the control circuit is configured to supply an electric current to the conductive element through the position detection wiring such that the electric current flows from the first point to the second point in the conductive element, to detect a potential difference between the third point and the fourth point of the conductive element, and to perform an operation according to a position of the magnet relative to the conductive element based on the potential difference detected.

2. The position detector according to claim 1, wherein the circuit board is provided with another wiring, which is different from the position detection wiring, and a circuit component.

3. The position detector according to claim 1, wherein the circuit board is provided with at least one first circuit component and at least one second circuit component,
   the at least one first circuit component is disposed on a first surface of the circuit board, the first surface facing the magnet,
   the at least one second circuit component is disposed on a second surface of the circuit board, the second surface being opposite to the first surface,
   the at least one first circuit component has a height smaller than a predetermined height with respect to a direction perpendicular to the first surface of the circuit board, and
   the at least one second circuit component has a height equal to or greater than the predetermined height with respect to a direction perpendicular to the second surface.

4. The position detector according to claim 3, wherein the predetermined height is smaller than a distance between the magnet and the circuit board with respect to the direction perpendicular to the first surface of the circuit board.

5. The position detector according to claim 1, wherein the conductive element is one of a plurality of conductive elements printed on the circuit board.

6. The position detector according to claim 5, wherein each of the plurality of conductive elements is connected to the control circuit through the position detection wiring, and
   the control circuit is configured to successively supply the electric current to the plurality of conductive elements such that the electric current is supplied to only one of the plurality of conductive elements at a time.

7. The position detector according to claim 1, wherein the conductive element has a width greater than a width of the position detection wiring.

* * * * *